(12) United States Patent
Schlipf

(10) Patent No.: US 8,993,935 B2
(45) Date of Patent: Mar. 31, 2015

(54) HEATING DEVICE WITH TEMPERATURE SENSOR

(75) Inventor: Andreas Schlipf, Tuttlingen (DE)

(73) Assignee: Türk & Hillinger GmbH, Tuttlingen (DE)

( * ) Notice: Subject to any disclaimer, the term of this patent is extended or adjusted under 35 U.S.C. 154(b) by 509 days.

(21) Appl. No.: 13/208,715

(22) Filed: Aug. 12, 2011

(65) Prior Publication Data

US 2012/0037607 A1 Feb. 16, 2012

(30) Foreign Application Priority Data

Aug. 13, 2010 (DE) .................. 20 2010 011 405 U

(51) Int. Cl.
| | |
|---|---|
| H05B 3/00 | (2006.01) |
| H05B 11/00 | (2006.01) |
| F27B 14/00 | (2006.01) |
| H05B 3/58 | (2006.01) |
| H05B 3/44 | (2006.01) |
| H05B 3/50 | (2006.01) |
| B29B 11/06 | (2006.01) |
| B29C 45/00 | (2006.01) |
| B29C 45/17 | (2006.01) |
| B29C 45/27 | (2006.01) |

(52) U.S. Cl.
CPC ......... B29C 45/1782 (2013.01); B29C 45/2737 (2013.01); B29C 2045/274 (2013.01)

USPC .......... 219/424; 219/201; 219/535; 219/544; 425/547; 392/465; 392/480; 392/489

(58) Field of Classification Search
USPC .......... 219/424, 535, 544, 201; 392/481, 480, 392/479, 472, 489, 478, 473, 465; 425/547, 425/548; 374/147
See application file for complete search history.

(56) References Cited

FOREIGN PATENT DOCUMENTS

| DE | 20 2008 013 626 U1 | 2/2009 | |
| DE | 202008013626 U1 * | 2/2009 | .............. B29C 45/27 |
| DE | 10 2008 055 640 A1 | 5/2010 | |
| DE | 10 2009 025 165 A1 | 1/2011 | |

* cited by examiner

Primary Examiner — Tu B Hoang
Assistant Examiner — Michael Hoang
(74) Attorney, Agent, or Firm — McGlew and Tuttle, P.C.

(57) ABSTRACT

A heating device (100, 200), which can be arranged at an object (101, 201) to be heated, especially an injection molding die, has an inner jacket surface (111, 211) and an outer jacket surface (112, 212), with a heating element (105, 205) and with a thermocouple (103, 203). The thermocouple (102, 203) has at least one positioning section, in which the cross section of the thermocouple (103, 203) deviates in at least one direction of the cross-sectional area from the cross section of at least one section of the thermocouple (103, 203) located adjacent to this positioning section. The heating device (100, 200) has at least one device for locking this positioning section against displacement in and/or opposite to the direction in which the thermocouple (103, 203) extends.

13 Claims, 4 Drawing Sheets

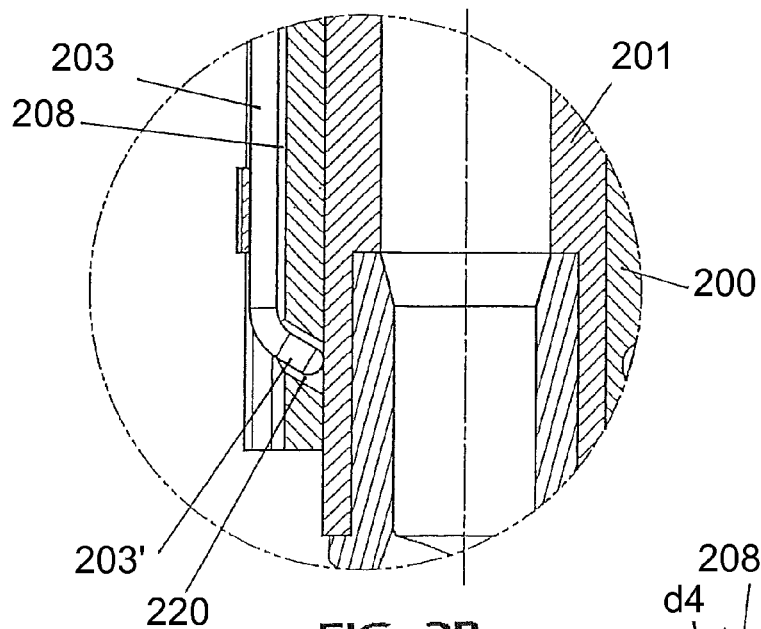
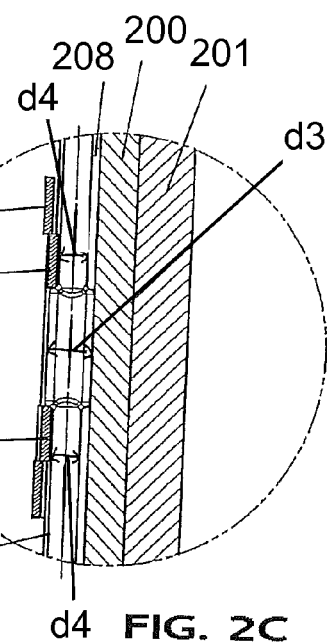
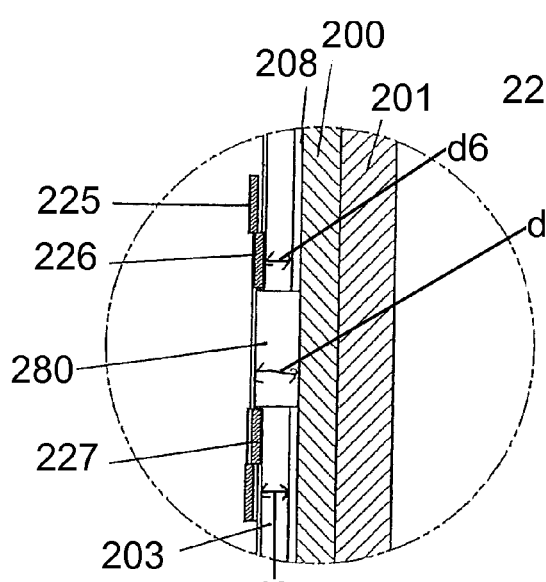

HEATING DEVICE WITH TEMPERATURE SENSOR

CROSS REFERENCE TO RELATED APPLICATIONS

This application claims the benefit of priority under 35 U.S.C. §119 of German Utility Model DE 20 2010 011 405.5 filed Aug. 13, 2010, the entire contents of which are incorporated herein by reference.

FIELD OF THE INVENTION

The present invention pertains to a heating device which can be arranged at an object to be heated, especially an injection molding die, which heating device has an inner jacket surface and an outer jacket surface with a heating element and with a thermocouple.

BACKGROUND OF THE INVENTION

Such heating devices are used, for example, in injection molding dies. They are pushed there over a material tube with a duct for the flowable material or placed around same. The outer wall of the material tube is surrounded by the heating device, which can be removed from the material tube. Furthermore, accurate temperature monitoring is important, which is achieved in practice by providing a thermocouple as a temperature sensor, whose sensor tip is in contact with the material tube and is fixed there, for example, in a crimped sleeve, which is welded to the material tube. This concrete embodiment brings with it, furthermore, the fact that the thermocouple must pass through the heating device, e.g., in a hole prepared for this purpose in the heating device, into which the thermocouple must be inserted. An example of such a hot nozzle is known, for example, from DE 10 2008 055 640 A1.

It was found in practice that the service lives of thermocouples and heating devices, which are used in hot nozzles, are different from each other in practice. However, it is complicated, if at all possible, in the prior-art embodiments to replace a defective thermocouple of a still functioning heating device or to use a functioning thermocouple of a defective heating device in conjunction with a new heating device that is able to function.

SUMMARY OF THE INVENTION

An object is therefore to provide a heating device that makes it possible to reliably position the sensor of the thermocouple while allowing the simple and rapid replacement of the thermocouple.

According to the invention, a heating device is provided, which can be arranged at an object to be heated, especially an injection molding die. The heating device comprises an inner jacket surface and an outer jacket surface, a heating element and a thermocouple. The thermocouple has at least one positioning section, in which the cross section of the thermocouple deviates in at least one direction of the cross-sectional area from the cross section of at least one section of the thermocouple, which latter section is located adjacent to the positioning section. The heating device has at least one means for locking this positioning section against the displacement thereof in and/or opposite the direction in which the thermocouple extends.

The heating device according to the present invention may be arranged at an object to be heated, especially an injection molding die, e.g., by pushing it over or enclosing said nozzle by means of a tilting mechanism. It has an inner jacket surface, an outer jacket surface and a heating element. This includes in the sense of this patent right especially heating devices in which the heating element is formed by a heating layer applied to the outer or inner jacket surface according to a plasma process, by printing or in another manner; thick-layer heating devices, heating devices with a heating element that is inserted into a groove, which is prepared in the inner or outer jacket surface of the heating device, and also heating devices in which the heating element is embedded in a powder or granular material between the jacket surfaces.

Furthermore, a thermocouple is provided. It is essential for the present invention that the thermocouple have at least one positioning section, in which the cross section of the thermocouple deviates in at least one direction of the cross-sectional area from the cross section of at least one section of the thermocouple located adjacent to said positioning section. This can be achieved, for example, by increasing the radius, especially by attaching a sleeve, or by reducing the radius in an essentially cylindrical thermocouple, but also by a deformation of the thermocouple in a direction of its cross section, which leads to an enlargement of the cross section in another direction of the cross section, or by attaching to the thermocouple a positioning element, which covers only part of the surface of the section, in which it is attached.

Furthermore, the heating device according to the present invention has at least one means for locking this section against it being displaced in and/or opposite the direction in which the thermocouple extends.

By providing the positioning section and the locking means, unintended displacement of the thermocouple in and/or opposite the direction in which the thermocouple extends is prevented from occurring with certainty. Yet, it remains, in principle, possible in this design to design the heating device such that the thermocouple can be easily replaced by the locking means being designed such that they permit the thermocouple to be inserted from at least one other direction than the direction in which the thermocouple extends.

An especially simple manner of providing such a thermocouple with a positioning section is to attach a sleeve to the thermocouple in order to form the positioning section. The sleeve may be attached, e.g., by pressing, welding or soldering.

However, it is also possible as an alternative that the original cross section of a commercially available thermocouple is deformed at one point in order to form the positioning section. However, this must be performed carefully and with well-controlled application of force, because the thermocouple may otherwise become damaged. The advantage of this embodiment is the especially compact design that can be obtained.

For example, recesses or grooves in the inner or outer jacket surface of the heating device, which mesh with the positioning section, may be provided as locking means if an especially compact design is desirable. However, projections, which themselves have recesses in especially preferred embodiments, into which the sections of the thermocouple that adjoin the positioning section and thus guide the thermocouple when it is being inserted, may also be provided as locking means at the inner jacket surface or outer jacket surface.

Provisions are made in another embodiment of the present invention, which is especially advantageous in terms of manufacturing technology, for the heating device to have at least one clamping ring and for the locking means to be arranged at the clamping ring. This can be achieved, for example, by tongues or straps being arranged at the clamping ring, and these are bent such that the positioning section is locked.

It is advantageous, furthermore, if the thermocouple has different diameters, preferably with the diameter of the thermocouple in the direction in which it extends becoming larger in the direction towards a terminal of the thermocouple.

The present invention will be explained in more detail below on the basis of drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1b is a detail view of detail X of the heating device according to FIG. 1a;

FIG. 1c is a detail view of a first embodiment of detail Y of the heating device according to FIG. 1a;

FIG. 1d is a detail view of a second embodiment of detail Y of the heating device according to FIG. 1a;

FIG. 2b is a detail view of detail D of the heating device according to FIG. 2a;

FIG. 2c is a detail view of a first embodiment of detail E of the heating device according to FIG. 2a; and FIG. 2d is a detail view of a second embodiment of detail E of the heating device according to FIG. 2a.

DESCRIPTION OF THE PREFERRED EMBODIMENTS

Figure 1A:
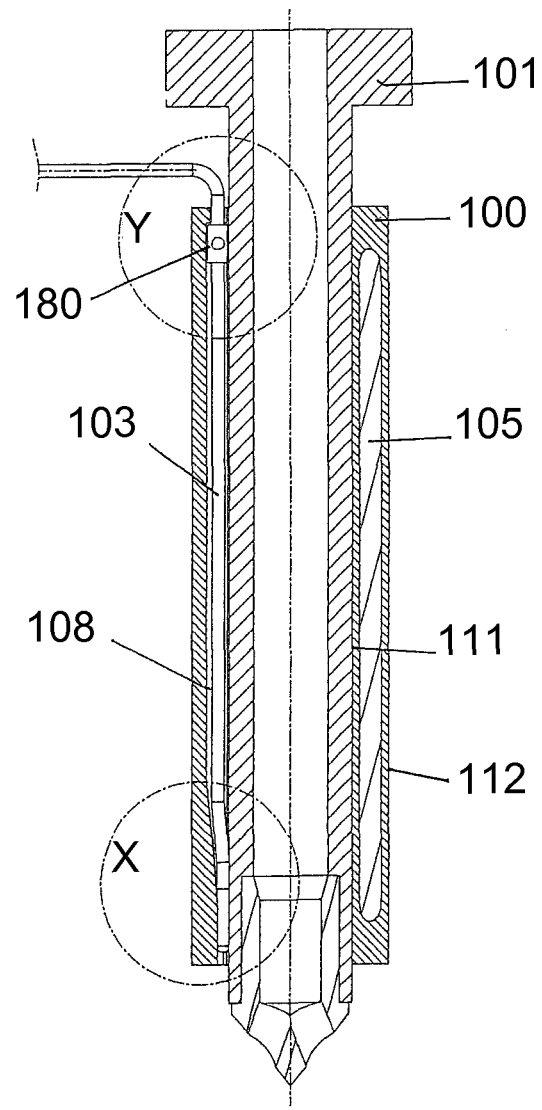
FIG. 1a is a sectional view of a first embodiment of the heating device.

Referring to the drawings in particular, identical reference numbers are used in all figures for identical components of the same exemplary embodiments. It is pointed out, furthermore, that the different locking means and positioning sections, which are shown in the drawings, may be freely combined with one another and may each be arranged both at the inner jacket surface and at the outer jacket surface.

FIG. 1a shows a sectional view of a first exemplary embodiment of a heating device 100. Heating device 100 is pushed over an object 101 to be heated. It has an inner jacket surface 111 and an outer jacket surface 112, between which a heating element 105 is arranged, with FIG. 1a showing a section through a winding of a meandering heating element 105. Furthermore, heating device 100 has a thermocouple 103, which is arranged in a groove 108 prepared in the inner jacket surface 111, adjacent to the object 101 to be heated.

FIG. 1a shows, furthermore, an area X marked by a circle drawn in broken line in the end section of heating device 100 and an area Y marked by a circle drawn in broken line in the area of supply of the thermocouple 103.

Figure 1B:
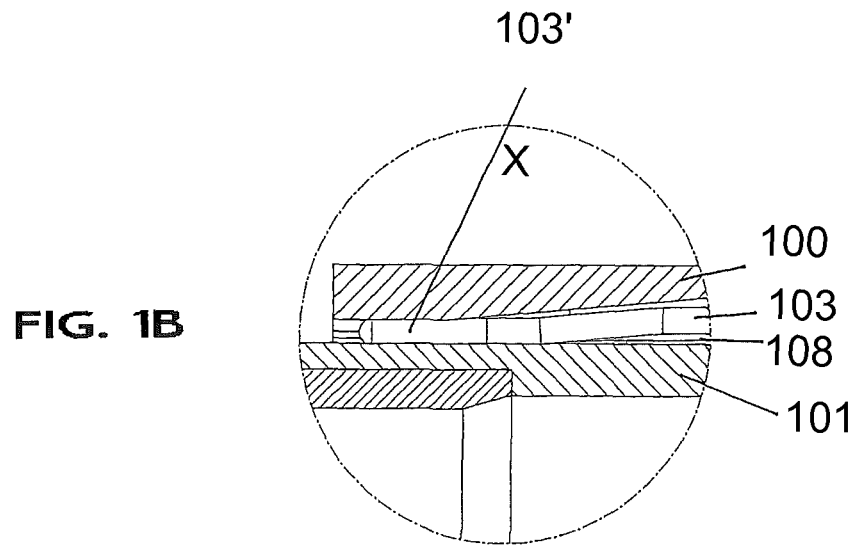

FIG. 1b shows detail X in an enlarged form. It is recognized, in particular, that a sensor tip 103' of thermocouple 103 is pressed onto the object 101 to be heated by a reduction of the depth of groove 108 and is wedged with this in order to fix the thermocouple.

Figure 1C:
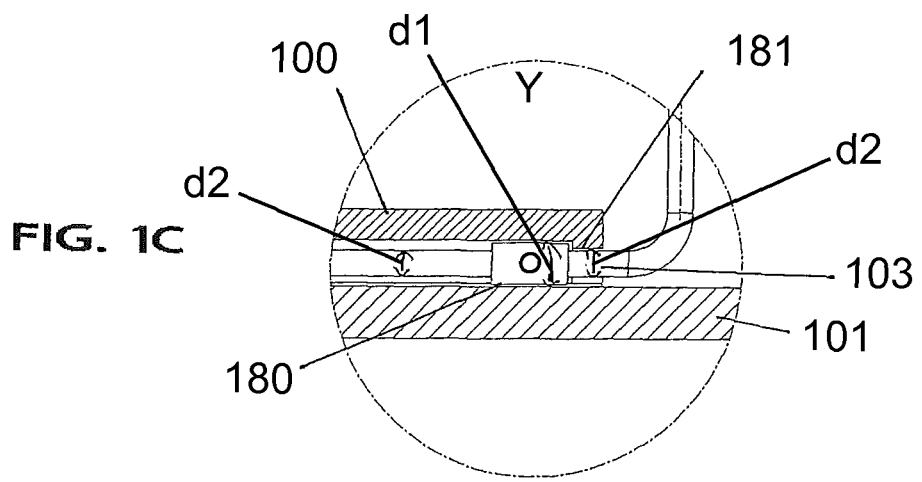
Figure 1D:
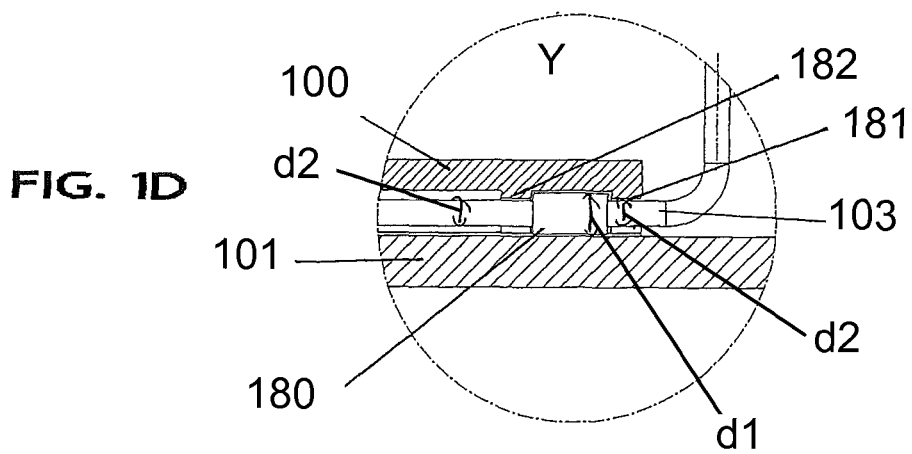

FIGS. 1c and 1d show exemplary enlargements of detail Y in two different embodiments. A sleeve 180 each, which is pushed over the thermocouple 103 and is fixed there, e.g., by welding, soldering or pressing, is used as the positioning section in both embodiments shown. By providing the sleeve 180 at the thermocouple 103, extension d1 of the thermocouple 103 in the positioning section is greater than extension d2 of the thermocouple 103 in the same direction in the sections of the thermocouple that are adjacent in the direction and opposite the direction in which thermocouple 103 is attached.

A projection 181, which meshes with the positioning section and which thus blocks a displacement of the thermocouple 103 in the direction in which the heating device 100 is attached, is arranged, in FIG. 1c, at the inner jacket surface 111 of heating device 102, which said jacket surface faces the object 101 to be heated.

In addition to the projection 181 shown in FIG. 1c, a projection 182 is also provided in the embodiment of FIG. 1d, and this projection 182 meshes with the positioning section, so that the displacement of the thermocouple 103 is blocked in the direction and opposite the direction in which the heating device 100 is attached. Instead of projections 181, 182, it would, of course, also be possible to achieve the same effect if recesses, which mesh with the positioning section, are provided in heating device 100.

Figure 2A:
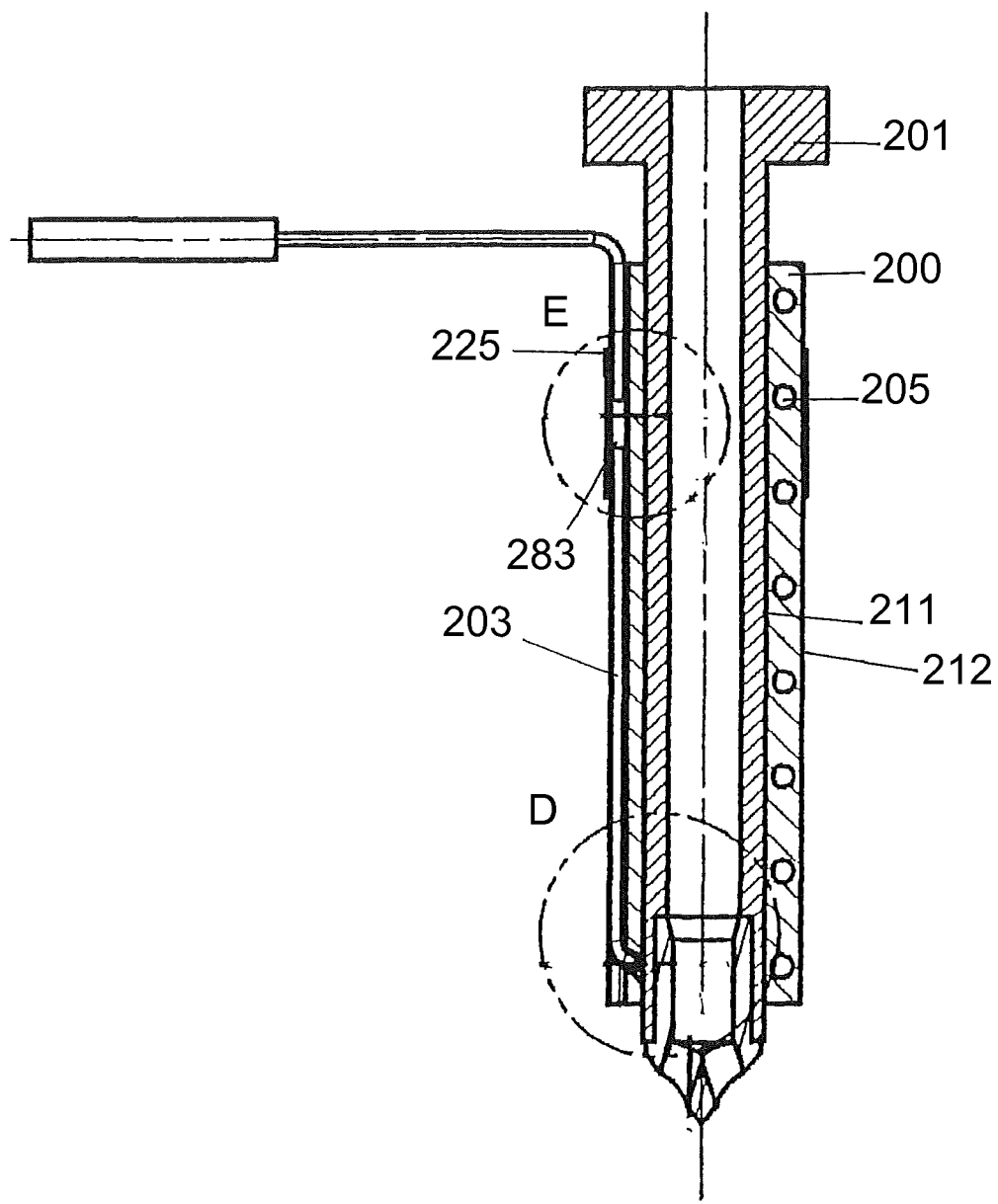
FIG. 2a is a sectional view of a second embodiment of the heating device.

FIG. 2a shows a sectional view of a second embodiment of a heating device 200. Heating device 200 is pushed over an object 201 to be heated. It has an inner jacket surface 211 and an outer jacket surface 212, between which a heating element 205 is arranged, where FIG. 2a shows a section through winding of a coiled heating element 205. Furthermore, heating device 200 has a thermocouple 203, which is arranged in a groove 208 prepared in the outer jacket surface 211, adjacent to the object 201 to be heated.

FIG. 2a shows, furthermore, an area D marked by a circle drawn in broken line in the end section of heating device 200 and an area E marked by a circle drawn in broken line in the area of the supply of thermocouple 203.

FIG. 2b shows detail D in an enlarged form. It is recognized, in particular, that a sensor tip 203' of thermocouple 203 is led through a hole 220, which passes through heating device 200, to the object 201 to be heated and is fixed thereby.

FIGS. 2a and 2d show exemplary enlarged details Y in two different embodiments. A section 283 of thermocouple 203, which said section is deformed by pressure in the direction at right angles to the section plane shown, is used as the positioning section in the embodiment according to FIG. 2c. Due to this pressure, the thermocouple has an extension d3 in this area, and this extension is greater than extension d4 in the adjoining sections of the thermocouple 203 that extend in the direction and opposite the direction in which thermocouple 203 extends.

Contrary to this, the positioning section is formed in the embodiment according to FIG. 2d by a sleeve 280, which is pushed over the thermocouple 203 and fixed there, e.g., welded, soldered or pressed. By providing the sleeve 280 at the thermocouple 203, extension d5 of the thermocouple 203 in the positioning section is greater than extension d6 of thermocouple 203 in the same direction in the adjacent sections of the thermocouple 203 in the direction and opposite the direction in which the thermocouple 203 extends.

A clamping ring 225 each, which has radially inwardly bent straps 226, 227, which mesh with the positioning section, so that locking against axial displacement of the thermocouple 203 is guaranteed, is provided as a means for locking the positioning section in both embodiments.

While specific embodiments of the invention have been shown and described in detail to illustrate the application of the principles of the invention, it will be understood that the invention may be embodied otherwise without departing from such principles.

APPENDIX

List of Reference Numbers
List of Reference Numbers [sic]

| | |
|---|---|
| D, E, X, Y | Detail |
| d1, d2, d3, d4, d5, d6 | Extension |
| 100, 200 | Heating device |
| 101, 201 | Object to be heated |
| 103, 203 | Thermocouple |
| 103', 203' | Sensor tip |
| 105, 205 | Heating element |
| 108, 208 | Groove |
| 111, 211 | Inner jacket surface |
| 112, 212 | Outer jacket surface |
| 180, 280 | Sleeve |
| 181, 182 | Projection |
| 225 | Clamping ring |
| 226, 227 | Straps |
| 283 | Deformed section |

What is claimed is:

1. A heating device, for arrangement at an object to be heated, the heating device comprising:
   an inner jacket surface;
   an outer jacket surface;
   a heating element;
   a thermocouple having at least one positioning section, in which a cross section of the thermocouple deviates, in at least one direction of a cross-sectional area of the thermocouple, from another cross section of another section of the thermocouple and said cross section of said thermocouple deviates in another direction of said cross-sectional area of the thermocouple from yet another cross section of yet another section of the thermocouple, said positioning section comprising a sleeve connected to said thermocouple, said another section and said yet another section being located adjacent to said sleeve, wherein said another section is located on one side of said sleeve and said yet another section being located on another side of said sleeve, wherein said thermocouple has different diameters, said inner jacket surface and said outer jacket surface defining a heating device interior space, said heating element being arranged in said heating device interior space, wherein said heating element is located between said inner jacket surface and said outer jacket surface; and
   at least one locking means for locking said at least one positioning section against one or more of a displacement of said at least one positioning section in a direction in which said thermocouple extends and a displacement of said at least one positioning section opposite to the direction in which said thermocouple extends, wherein said locking means comprises a projection of said inner jacket surface, said projection having a portion extending radially in a direction of said thermocouple with respect to a longitudinal axis of said thermocouple, wherein said portion of said projection is located axially adjacent to said sleeve with respect to said longitudinal axis of said thermocouple.

2. The heating device in accordance with claim 1, wherein said inner jacket surface defines a second projection and a recess located between said projection and said second projection, said projection being located on said one side of said sleeve, said second projection being located on said another side of said sleeve, at least a portion of said sleeve being located in said recess, wherein said at least said portion of said sleeve is located between said projection and said second projection, said at least one locking means comprising said projection, said second projection and said recess, said thermocouple having a sensor tip, said at least one positioning section being located at a spaced location from said sensor tip, said one side of said sleeve being located at a spaced location from said another side of said sleeve with respect to a longitudinal axis of said thermocouple.

3. The heating device in accordance with claim 1, wherein said positioning section comprises a deformation in the cross section of said thermocouple at a region to form said positioning section, said inner jacket surface and an object to be heated defining a channel, said positioning section being located in said channel, at least a portion of said thermocouple being in direct contact with the object to be heated.

4. The heating device in accordance with claim 1, wherein said locking means comprises a recess in said inner jacket surface, which meshes with said positioning section.

5. The heating device in accordance with claim 1, wherein a diameter of said thermocouple becomes larger in at least one of a direction of extension and in a direction of a terminal of said thermocouple.

6. A heating device for heating an injection molding die, the heating device comprising:
   an inner jacket defining an inner surface for contact with the injection molding die;
   an outer jacket with an outer surface;
   a heating element disposed between said inner jacket and said outer jacket;
   a thermocouple disposed between said inner jacket and said outer jacket, said thermocouple having a positioning section with a positioning cross section which has a dimension that deviates from a cross section of another section of the thermocouple and a cross section of yet another section of the thermocouple, said positioning section comprising a sleeve, said another section and said yet another section being located adjacent to said sleeve, wherein said another section is located on one side of said sleeve and said yet another section is located on another side of said sleeve, wherein said thermocouple has different diameters, said inner jacket surface and said outer jacket surface defining a heating device interior space, said heating element being arranged in said heating device interior space, wherein said heating element is located between said inner jacket surface and said outer jacket surface;
   a locking means for locking said positioning section against a displacement of said thermocouple in either direction along which said thermocouple extends, wherein said locking means comprises a projection of said inner jacket surface, said projection having a portion extending radially in a direction of said thermocouple with respect to a longitudinal axis of said thermocouple, wherein said portion of said projection is located axially adjacent to said sleeve with respect to said longitudinal axis of said thermocouple.

7. The heating device in accordance with claim 6, wherein said sleeve is formed independent of said inner jacket, said inner jacket and an object to be heated defining a channel, said positioning section being arranged in said channel, at least a portion of said thermocouple being in direct contact with the object, said thermocouple comprising a thermocouple end portion, said sleeve being located at a spaced location from said thermocouple end portion.

8. The heating device in accordance with claim 6, wherein said positioning section comprises a deformation of said thermocouple.

9. The heating device in accordance with claim 6, wherein said locking means comprises a recess defined by said inner jacket surface.

10. The heating device in accordance with claim 6, wherein said thermocouple has different diameters with a change in diameter forming said positioning section.

11. The heating device in accordance with claim 6, wherein a diameter of said thermocouple becomes larger in at least one of a direction of extension and in a direction of a terminal of said thermocouple to form said positioning section.

12. The heating device in accordance with claim 6, wherein said inner jacket defines a second projection and a recess located between said projection and said second projection, at least a portion of said sleeve being located in said recess, said second projection extending in a radial direction with respect to a longitudinal axis of said thermocouple, said projection being located at an axially spaced location from said second projection with respect to said longitudinal axis of said thermocouple, said projection and said second projection comprising an axially extending surface, said axially extending surface being located opposite a portion of said thermocouple, wherein said at least said portion of said sleeve is located between said projection and said second projection, said at least one locking means comprising said projection, said second projection and said recess, said thermocouple having a sensor tip, said at least one positioning section and said locking means being located at a spaced location from said sensor tip.

13. A heating device, for arrangement at an object to be heated, the heating device comprising:
an inner jacket surface;
an outer jacket surface;
a heating element located between said inner jacket surface and said outer jacket surface;
a thermocouple comprising a sensor tip and at least one positioning section, said at least one positioning section comprising at least one positioning cross section, said at least one positioning cross section having a dimension that deviates from a second cross section of a second section of the thermocouple and a third cross section of a third section of the thermocouple, said second section and said third section being located adjacent to said at least one positioning section, wherein said second section is located on one side of said at least one positioning section and said third section is located on another side of said at least one positioning section; and
at least one locking means for locking said at least one positioning section against one or more of a displacement of said at least one positioning section in a direction in which said thermocouple extends and a displacement of said at least one positioning section opposite to the direction in which said thermocouple extends, said at least one locking means and said at least one positioning section being located at a spaced location from said sensor tip, said at least one locking means comprising at least one projection, said inner jacket surface defining said at least one projection, said at least one projection comprising at least one projection portion extending in a radial direction with respect to a longitudinal axis of said thermocouple, wherein a portion of said at least one positioning section is located opposite said at least one projection portion with respect to said longitudinal axis of said thermocouple.

* * * * *